United States Patent
Hoshino et al.

(10) Patent No.: US 10,730,508 B2
(45) Date of Patent: Aug. 4, 2020

(54) HYBRID VEHICLE AND CONTROL METHOD FOR HYBRID VEHICLE

(71) Applicant: HONDA MOTOR CO., LTD., Minato-ku, Tokyo (JP)

(72) Inventors: Daisuke Hoshino, Wako (JP); Yutaka Arimura, Wako (JP); Tatsuya Ohzu, Wako (JP); Shingo Soma, Wako (JP); Yosuke Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/281,844

(22) Filed: Feb. 21, 2019

(65) Prior Publication Data

US 2019/0263381 A1 Aug. 29, 2019

(30) Foreign Application Priority Data

Feb. 23, 2018 (JP) .................................. 2018-030906

(51) Int. Cl.
*B60W 20/40* (2016.01)
*B60W 20/15* (2016.01)
*B60K 6/387* (2007.10)
*B60K 6/442* (2007.10)

(52) U.S. Cl.
CPC ............ *B60W 20/40* (2013.01); *B60K 6/387* (2013.01); *B60K 6/442* (2013.01); *B60W 20/15* (2016.01)

(58) Field of Classification Search
CPC .................. B60W 20/10–19; B60W 20/40
See application file for complete search history.

(56) References Cited

U.S. PATENT DOCUMENTS

| | | | |
|---|---|---|---|
| 2009/0266179 A1 | 10/2009 | Oniwa et al. | |
| 2013/0192417 A1 | 8/2013 | Fujita et al. | |
| 2017/0158043 A1 | 6/2017 | Tsukamoto | |
| 2019/0308607 A1* | 10/2019 | Ebus | B60W 10/06 |

FOREIGN PATENT DOCUMENTS

| | | |
|---|---|---|
| JP | 2000-023312 A | 1/2000 |
| JP | 2009-264812 A | 11/2009 |
| JP | 2017-100590 A | 6/2017 |
| WO | 2012/053361 A1 | 4/2012 |

OTHER PUBLICATIONS

Office Action dated Jun. 18, 2019 issued over the corresponding Japanese Patent Application No. 2018-030906 with the English translation of pertinent portion.

* cited by examiner

*Primary Examiner* — Erin D Bishop
(74) *Attorney, Agent, or Firm* — Carrier Blackman & Associates, P.C.; Joseph P. Carrier; William D. Blackman

(57) ABSTRACT

A vehicle is equipped with a torque sensor configured to detect a torque, and which is disposed between an internal combustion engine and a first switching device on a first transmission path. When the first switching device is switched from a disconnected state to a connected state, a control device calculates a torque difference between a target torque of the internal combustion engine corresponding to a specified point on the first transmission path, and a detected torque or the like detected by the torque sensor. Further, the control device generates in a first rotary electric machine or a second rotary electric machine a compensation torque that compensates for the torque difference.

5 Claims, 4 Drawing Sheets

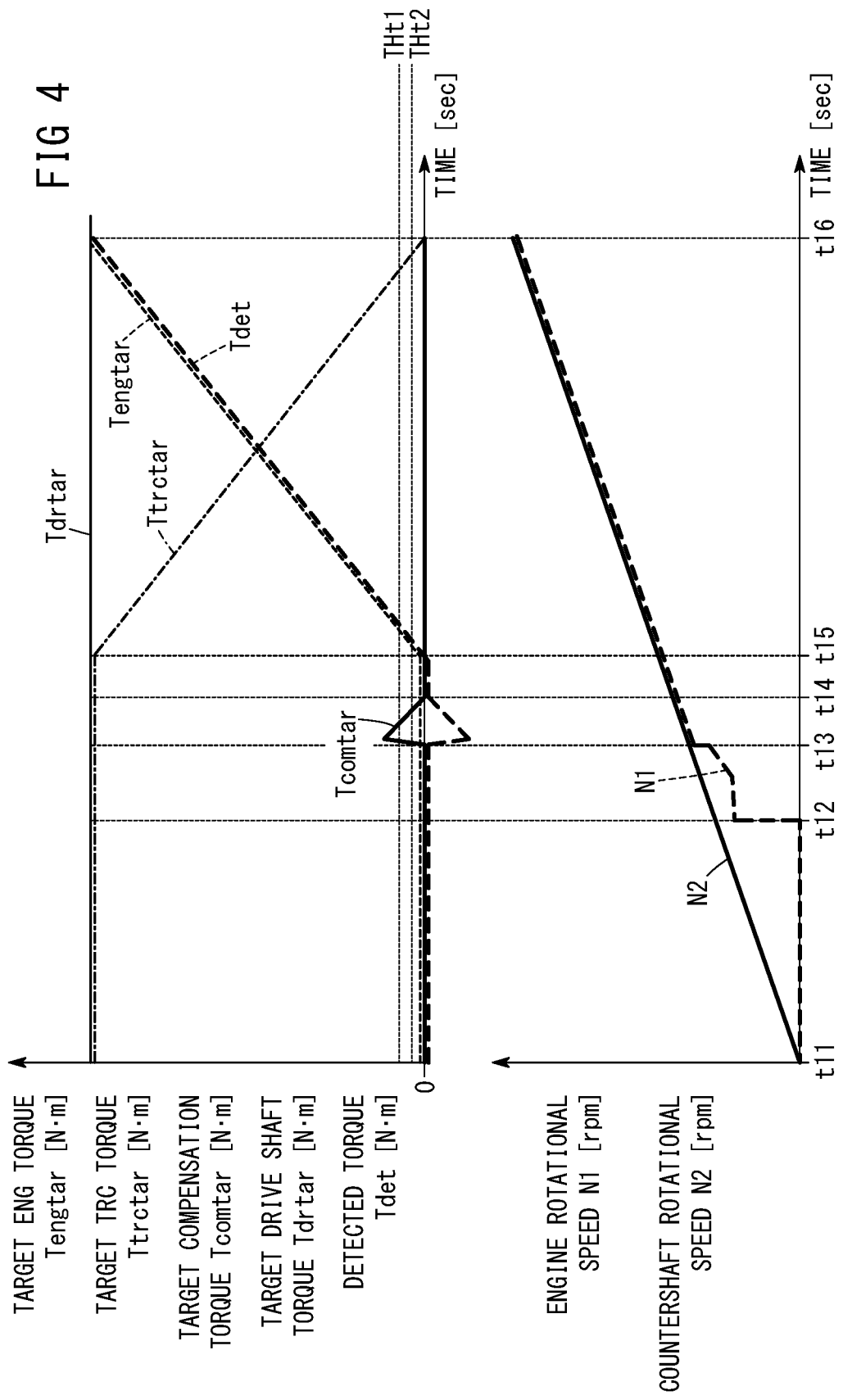

HYBRID VEHICLE AND CONTROL METHOD FOR HYBRID VEHICLE

CROSS-REFERENCE TO RELATED APPLICATION

This application is based upon and claims the benefit of priority from Japanese Patent Application No. 2018-030906 filed on Feb. 23, 2018, the contents of which are incorporated herein by reference.

BACKGROUND OF THE INVENTION

Field of the Invention

The present invention relates to a hybrid vehicle equipped with an internal combustion engine, a first rotary electric machine, and a second rotary electric machine, as well as to a control method for controlling such a hybrid vehicle.

Description of the Related Art

Japanese Laid-Open Patent Publication No. 2017-100590 has the object of providing a vehicle capable of realizing one or both of an improvement in fuel consumption efficiency, and an improvement in travel performance of the vehicle (paragraph [0008], abstract). In order to achieve this object, the vehicle 10 disclosed in Japanese Laid-Open Patent Publication No. 2017-100590 (see abstract and FIG. 1) comprises an internal combustion engine 20, a first rotary electric machine 22, a second rotary electric machine 24, a first switching device 26, a second switching device 28, and a control circuit 54. In the event that the vehicle velocity V exceeds a first vehicle velocity threshold value in a state in which the first switching device 26 is in a connected state, and power is being transmitted from the internal combustion engine 20 to a vehicle wheel 32, the control circuit 54 controls the second switching device 28 to be placed in a disconnected state.

SUMMARY OF THE INVENTION

As noted above, according to Japanese Laid-Open Patent Publication No. 2017-100590, in order to enhance fuel consumption efficiency or to improve the travel performance of the vehicle, in a state in which power is being transmitted from the internal combustion engine 20 to the vehicle wheel 32, in the case that the vehicle velocity V exceeds the first vehicle velocity threshold value, the second switching device 28 is controlled to be placed in a disconnected state (abstract). However, room remains for improvement in relation to the method of utilizing the first rotary electric machine 22 or the second rotary electric machine 24 which are capable of being connected to the internal combustion engine 20.

For example, in the case that switching is performed from traveling by the second rotary electric machine 24 to traveling by the internal combustion engine 20, it is necessary for the first switching device 26 to be switched from a disconnected state to a connected state. If such switching is carried out, there is a possibility that a shock may occur in the first switching device 26. Such a shock may adversely influence the riding comfort of the vehicle occupants. In Japanese Laid-Open Patent Publication No. 2017-100590, no consideration is given in relation to alleviating shocks that occur in the first switching device 26.

The present invention has been devised taking into consideration the aforementioned problems, and has the object of providing a hybrid vehicle and a control method for such a hybrid vehicle, which are capable of improving the riding comfort of the vehicle occupants.

A hybrid vehicle according to the present invention comprises:
an internal combustion engine;
a first transmission path configured to transmit power generated by the internal combustion engine to a vehicle wheel;
a first switching device disposed on the first transmission path, and configured to switch between a connected state and a disconnected state between the internal combustion engine and the vehicle wheel;
a first rotary electric machine;
a second transmission path connecting the first rotary electric machine and a first branch point located more on a side of the internal combustion engine than the first switching device within the first transmission path;
a second rotary electric machine;
a third transmission path connecting the second rotary electric machine and a second branch point located more on a side of the vehicle wheel than the first switching device within the first transmission path; and
a control device configured to control the internal combustion engine, the first switching device, the first rotary electric machine, and the second rotary electric machine;
the hybrid vehicle further comprising a torque sensor configured to detect a torque, and which is disposed between the internal combustion engine and the first switching device on the first transmission path;
wherein, when the first switching device is switched from a disconnected state to a connected state and drives the vehicle wheel by the internal combustion engine, the control device is configured to:
calculate a torque difference between a target torque of the internal combustion engine corresponding to a specified point on the first transmission path, and a detected torque detected by the torque sensor, or a torque obtained by converting the detected torque into a torque at the specified point; and
generate in the first rotary electric machine or the second rotary electric machine a compensation torque that compensates for the torque difference.

According to the present invention, when the first switching device is switched from the disconnected state to the connected state and drives the vehicle wheel by the internal combustion engine, the compensation torque, which compensates for the torque difference between the target torque of the internal combustion engine corresponding to the specified point on the first transmission path and the detected torque detected by the torque sensor (or a torque obtained by converting the detected torque into a torque at the specified point), is generated in the first rotary machine or the second rotary machine. In accordance with this feature, it becomes possible to alleviate any shocks generated when the first switching device is switched from the disconnected state to the connected state, thereby improving the riding comfort of the vehicle occupants.

The torque sensor may be a magnetostrictive torque sensor disposed between the first branch point and the first switching device on the first transmission path. By using the magnetostrictive torque sensor, with a comparatively simple configuration, it becomes possible to detect the torque with high accuracy. Further, by arranging the torque sensor between the first branch point and the first switching device, it becomes possible to output the compensation torque with higher accuracy as compared to a case in which the torque sensor is disposed between the internal combustion engine and the first branch point.

On a basis of travel information of the vehicle, the control device may be configured to switch between a rotary electric machine travel mode in which the vehicle wheel is driven by the second rotary electric machine in a state in which the first switching device is in a disconnected state, and an internal combustion engine travel mode in which the vehicle wheel is driven by the internal combustion engine in a state in which the first switching device is in a connected state. Further, when switching from the rotary electric machine travel mode to the internal combustion engine travel mode, the control device may be configured to cause the first rotary electric machine to generate the compensation torque. In accordance with this feature, it becomes possible to alleviate any shocks generated by the first switching device when switching from the rotary electric machine travel mode to the internal combustion engine travel mode.

The control device may be configured to determine whether or not the first switching device is in a connected state on a basis of the detected torque. In accordance with this feature, it becomes possible to determine the connected state of the first switching device with high accuracy.

In a control method for controlling a hybrid vehicle according to the present invention, the hybrid vehicle comprises:

an internal combustion engine;

a first transmission path configured to transmit power generated by the internal combustion engine to a vehicle wheel;

a first switching device disposed on the first transmission path, and configured to switch between a connected state and a disconnected state between the internal combustion engine and the vehicle wheel;

a first rotary electric machine;

a second transmission path connecting the first rotary electric machine and a first branch point located more on a side of the internal combustion engine than the first switching device within the first transmission path;

a second rotary electric machine;

a third transmission path connecting the second rotary electric machine and a second branch point located more on a side of the vehicle wheel than the first switching device within the first transmission path; and a control device configured to control the internal combustion engine, the first switching device, the first rotary electric machine, and the second rotary electric machine;

the hybrid vehicle further comprising a torque sensor configured to detect a torque, and which is disposed between the internal combustion engine and the first switching device on the first transmission path;

wherein, when the first switching device is switched from a disconnected state to a connected state and drives the vehicle wheel by the internal combustion engine, the control device performs the steps of:

calculating a torque difference between a target torque of the internal combustion engine corresponding to a specified point on the first transmission path, and a detected torque detected by the torque sensor, or a torque obtained by converting the detected torque into a torque at the specified point; and generating in the first rotary electric machine or the second rotary electric machine a compensation torque that compensates for the torque difference.

According to the present invention, it becomes possible to improve the riding comfort of the vehicle occupants.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a time chart showing various numerical values in the case that the ENG torque compensation control is implemented in the present embodiment.

DESCRIPTION OF THE PREFERRED EMBODIMENTS

A. Present Embodiment

A-1. Configuration of Present Embodiment

[A-1-1. Overall Configuration]

Figure 1:
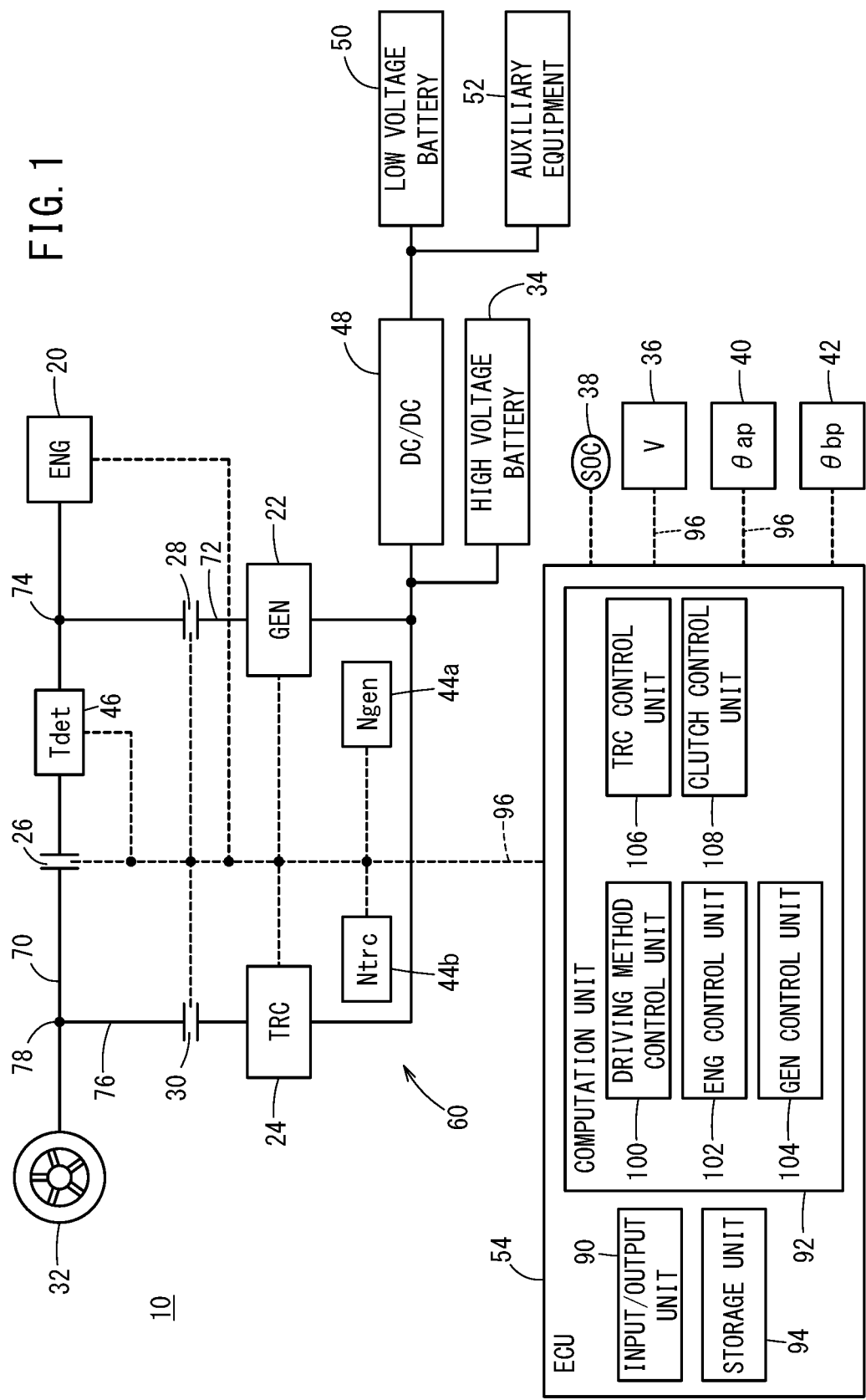
FIG. 1 is a schematic configuration diagram of a vehicle according to an embodiment of the present invention.

FIG. 1 is a schematic configuration diagram of a vehicle 10 according to an embodiment of the present invention. The vehicle 10 is a so-called hybrid vehicle. The vehicle 10 includes an engine 20, a first rotary electric machine 22, a second rotary electric machine 24, a first clutch 26, a second clutch 28, a third clutch 30, a vehicle wheel 32, a high voltage battery 34, a vehicle velocity sensor 36, an SOC (state of charge) sensor 38, an AP (accelerator pedal) operation amount sensor 40, a BP (brake pedal) operation amount sensor 42, rotational speed sensors 44a, 44b, a torque sensor 46, a step-down converter 48, a low voltage battery 50, electrical auxiliary equipment 52, and an electronic control unit 54 (hereinafter referred to as an "ECU 54").

Hereinafter, the engine 20, the first rotary electric machine 22, the second rotary electric machine 24, the first clutch 26, the second clutch 28, and the third clutch 30 will be collectively referred to as a drive system 60. A power transmission path connecting the engine 20 and the vehicle wheel 32 is referred to as a first transmission path 70. The first transmission path 70 transmits the motive power Feng generated by the engine 20 to the vehicle wheel 32. Furthermore, a power transmission path connecting the first rotary electric machine 22 and a first branch point 74, which is more on a side of the engine 20 than the first clutch 26 within the first transmission path 70, is referred to as a second transmission path 72. Further still, a power transmission path connecting the second rotary electric machine 24 and a second branch point 78, which is more on the side of the vehicle wheel 32 than the first clutch 26 within the first transmission path 70, is referred to as a third transmission path 76.

Figure 2:
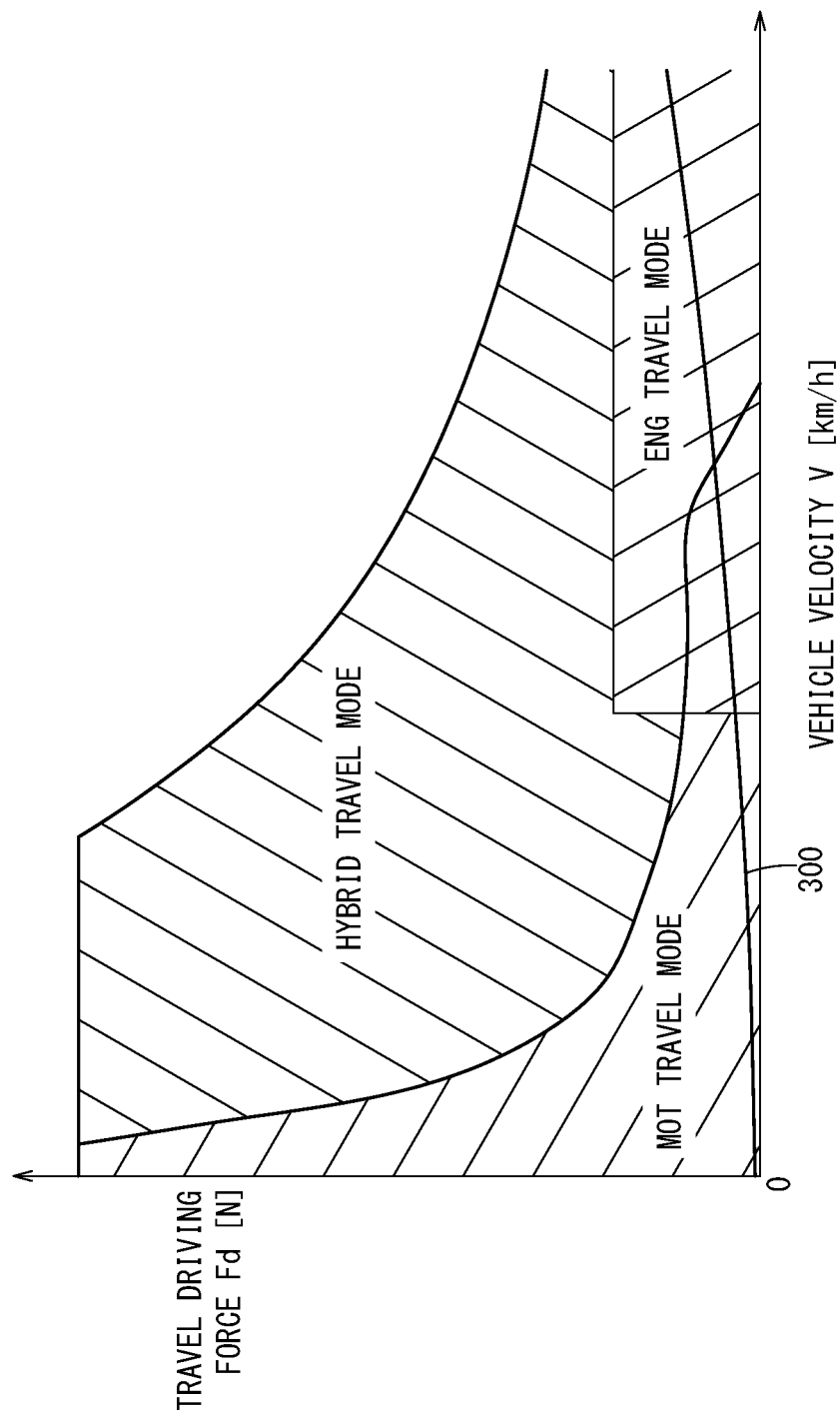
FIG. 2 is a diagram for explaining a travel mode selection method that is used in the present embodiment.

The configuration of the drive system 60 and the like may be the same configuration as disclosed, for example, in Japanese Laid Open Patent Publication No. 2017-100590 or International Publication No. WO 2012/053361 (for example, see FIG. 2 of Japanese Laid-Open Patent Publication No. 2017-100590).

[A-1-2. Engine 20]

The engine 20 generates the motive power Feng as a first drive source for enabling the vehicle 10 to travel, and supplies the motive power Feng to the vehicle wheel 32 (drive wheel). Further, by the motive power Feng, the engine 20 operates the first rotary electric machine 22 to thereby generate electrical power. Hereinafter, "ENG" or "eng" will be appended to parameters related to the engine 20. Further, in FIG. 1, etc., the engine 20 is indicated by "ENG".

[A-1-3. First Rotary Electric Machine 22]

The first rotary electric machine 22 is a three-phase AC brushless type rotary electric machine, and functions as a generator that generates electrical power by the motive power Feng from the engine 20. The electrical power Pgen generated by the first rotary electric machine 22 is supplied via a non-illustrated first inverter to the high voltage battery 34 (hereinafter also referred to as a "battery 34"), the second rotary electric machine 24, or the electrical auxiliary equipment 52. The first rotary electric machine 22 is an interior permanent magnet synchronous motor (IPMSM). The first rotary electric machine 22 includes a stator and a rotor, neither of which are shown.

Hereinafter, the first rotary electric machine 22 may also be referred to as a generator 22. In addition to or instead of its function as a generator, the first rotary electric machine 22 may also function as a traction motor. Hereinafter, "GEN" or "gen" will be appended to parameters related to the generator 22. Further, in FIG. 1, etc., the generator 22 is indicated by "GEN". The generator 22 can be used as a starter motor for the engine 20.

[A-1-4. Second Rotary Electric Machine 24]

The second rotary electric machine 24 is a three-phase AC brushless type rotary electric machine, generates motive power Ftrc as a second drive source for enabling the vehicle 10 to travel, and supplies the generated motive power Ftrc to the vehicle wheel 32 (drive wheel). More specifically, the second rotary electric machine 24 functions as a traction motor, which is driven by one or both of the electrical power Pbat from the high voltage battery 34 and the electrical power Pgen from the generator 22. Further, the second rotary electric machine 24 regenerates power during braking of the vehicle 10, and supplies regenerative electrical power Preg to the battery 34 via a non-illustrated second inverter. The regenerative electrical power Preg may also be supplied to the electrical auxiliary equipment 52 (hereinafter also referred to as "auxiliary equipment 52"). In the same manner as the generator 22, the second rotary electric machine 24 is an interior permanent magnet synchronous motor (IPMSM). The second rotary electric machine 24 includes a stator and a rotor, neither of which are shown.

Hereinafter, the second rotary electric machine 24 may also be referred to as a traction motor 24 or a TRC motor 24. In addition to or instead of its function as a traction motor, the second rotary electric machine 24 may also function as a generator. Hereinafter, "TRC" or "trc" will be appended to parameters related to the traction motor 24. Further, in FIG. 1, etc., the traction motor 24 is indicated by "TRC".

[A-1-5. First Clutch 26, Second Clutch 28, and Third Clutch 30]

The first clutch 26 (first switching device) is disposed on the first transmission path 70, and on the basis of a command from the ECU 54, switches between a connected state and a disconnected state between the engine 20 and the vehicle wheel 32. Hereinafter, the first clutch 26 is also referred to as an ENG clutch 26 or a COM clutch 26. In this instance, the abbreviation "COM" implies a clutch that is used "commonly" (in common) with the engine 20 and the generator 22.

The second clutch 28 (second switching device) is disposed on the second transmission path 72, and on the basis of a command from the ECU 54, switches between a connected state and a disconnected state between the first transmission path 70 and the generator 22. Hereinafter, the second clutch 28 is also referred to as a GEN clutch 28.

The third clutch 30 (third switching device) is disposed on the third transmission path 76, and on the basis of a command from the ECU 54, switches between a connected state and a disconnected state between the first transmission path 70 and the traction motor 24.

Hereinafter, the third clutch 30 is also referred to as a TRC clutch 30.

[A-1-6. High Voltage Battery 34]

The high voltage battery 34 is a power storage device (energy storage) including a plurality of battery cells, and is capable of outputting a high voltage (several hundreds of volts). For the high voltage battery 34, there can be used, for example, a lithium ion secondary battery, a nickel hydrogen secondary battery, an all-solid battery, or the like. In addition to or instead of the battery 34, a power storage device such as a capacitor or the like can be used.

[A-1-7. Various Sensors]

The vehicle velocity sensor 36 detects the vehicle velocity V [km/h] of the vehicle 10, and transmits the detected vehicle velocity V to the ECU 54. The SOC sensor 38 is constituted from a non-illustrated current sensor or the like, and detects the state of charge (SOC) of the battery 34, and transmits the detected state of charge to the ECU 54.

The AP operation amount sensor 40 detects an amount of depression (AP operation amount θap) [deg] or [%] from an original position of a non-illustrated accelerator pedal, and transmits the detected amount of depression to the ECU 54. The BP operation amount sensor 42 detects an amount of depression (BP operation amount θbp) [deg] or [%] from an original position of a non-illustrated brake pedal, and transmits the detected amount of depression to the ECU 54.

The rotational speed sensor 44a detects a rotational speed Ngen [rpm] as a rotational speed per unit time of the generator 22, and transmits the detected rotational speed Ngen to the ECU 54. The rotational speed sensor 44b detects a rotational speed Ntrc [rpm] as a rotational speed per unit time of the traction motor 24, and transmits the detected rotational speed Ntrc to the ECU 54.

The torque sensor 46 is disposed between the engine 20 and the first clutch 26 on the first transmission path 70, and detects a torque Tdet (hereinafter also referred to as a "detected torque Tdet"). The torque sensor 46 according to the present embodiment, for example, is a magnetostrictive type of torque sensor, which is arranged on a portion (common axis) between the first branch point 74 and the first clutch 26, among portions of the engine shaft that is coaxially connected to the crankshaft of the engine 20. More specifically, the torque sensor 46 includes a plurality of magnetostrictive films (not shown) which are formed on the common axis, and a plurality of coils (not shown) arranged in facing relation to the common axis. Concerning the specific configuration of the torque sensor 46, for example, the configuration described in Japanese Laid-Open Patent Publication No. 2009-264812 can be applied.

[A-1-8. Step-Down Converter 48, Low Voltage Battery 50, and Electrical Auxiliary Equipment 52]

The step-down converter 48 steps down a battery voltage Vbat, a generated voltage Vgen, or a regenerative voltage Vreg, and supplies the stepped-down voltage to the electrical auxiliary equipment 52. The battery voltage Vbat is an output voltage from the battery 34, the generated voltage Vgen is an output voltage occurring at a time that electrical power is generated by the generator 22, and the regenerative voltage Vreg is an output voltage of the traction motor 24 occurring at a time that power is regenerated. Among the auxiliary equipment 52, there are included, for example, lights, an air conditioner, a navigation device, an audio device, and the like.

[A-1-9. ECU 54]

The ECU 54 is a control device (or a control circuit) that controls the drive system 60 in its entirety, and includes an input/output unit 90, a computation unit 92, and a storage unit 94. The input/output unit 90 inputs and outputs signals to and from respective components of the vehicle 10 via a signal line 96 (communications line). The input/output unit 90 comprises a non-illustrated A/D conversion circuit that converts input analog signals into digital signals.

The computation unit 92 includes a central processing unit (CPU) and operates by executing programs stored in the storage unit 94. A portion of the functions executed by the computation unit 92 can also be realized using logic ICs (Integrated Circuits). The programs may be supplied from the exterior via a non-illustrated wireless communications device (mobile phone, smartphone, or the like). In the computation unit 92, a portion of the programs may be constituted by hardware (circuit components).

As shown in FIG. 1, the computation unit 92 includes a driving method control unit 100, an engine control unit 102, a generator control unit 104, a traction motor control unit 106, and a clutch control unit 108.

The driving method control unit 100 controls the driving method of the vehicle 10. In this instance, the driving method includes a driving method using the engine 20, a driving method using the traction motor 24, and a driving method using the engine 20 and the traction motor 24. At this time, generation of electrical power by the generator 22 or power regeneration (generation of electrical power) by the traction motor 24 is also controlled. Details thereof will be described later with reference to FIG. 2, etc.

The engine control unit 102 (hereinafter also referred to as an "ENG control unit 102") controls the engine 20 on the basis of commands from the driving method control unit 100. The generator control unit 104 (hereinafter also referred to as a "GEN control unit 104") controls the generator 22 on the basis of commands from the driving method control unit 100. The GEN control unit 104 of the present embodiment executes an ENG torque compensation control. The ENG torque compensation control is a control to compensate with the generator 22 any insufficiency of the engine torque Teng at a time of engagement of the first clutch 26 or the like (details thereof will be described later with reference to FIGS. 3 and 4).

The traction motor control unit 106 (hereinafter also referred to as a "TRC control unit 106") controls the traction motor 24 on the basis of commands from the driving method control unit 100. The clutch control unit 108 controls the first through third clutches 26, 28, 30 on the basis of commands from the driving method control unit 100.

The storage unit 94 stores programs and data used by the computation unit 92, and includes a random access memory (hereinafter referred to as a "RAM"). As the RAM, a volatile memory such as a register or the like, and a nonvolatile memory such as a flash memory or the like can be used. Further, in addition to the RAM, the storage unit 94 may also include a read only memory (ROM).

A-2. Travel Modes

[A-2-1. Outline]

FIG. 2 is a diagram for explaining a travel mode selection method that is used in the present embodiment. According to the present embodiment, a MOT travel mode, a hybrid travel mode, an ENG travel mode, and a power regeneration mode are used. As shown in FIG. 2, the MOT travel mode, the hybrid travel mode, and the ENG travel mode are selected primarily in accordance with the vehicle velocity V and a travel driving force Fd of the vehicle 10.

It should be noted that the travel driving force Fd may be any one of an actual measurement value, an estimated value, or a required value. Further, although the units of the travel driving force Fd are stated herein as "Newtons (N)", the travel driving force Fd may be expressed in units of "Nm" as a torque. In the case that the travel driving force Fd is a required value, the ECU 54 calculates the travel driving force Fd using the vehicle velocity V, the AP operation amount θap, and the BP operation amount θbp, etc.

Further, in FIG. 2, a travel resistance line 300 is shown. The travel resistance line 300 is indicative of a resistance Rt (hereinafter also referred to as a "travel resistance Rt") that the vehicle 10 receives when traveling on a specified type of travel path (for example, a flat asphalt road). When an acceleration due to the travel driving force Fd of the vehicle 10 is in equilibrium with a deceleration due to the travel resistance Rt, the vehicle 10 travels at a constant velocity. Stated otherwise, in order for the vehicle 10 to travel at a constant velocity at a specified vehicle velocity V, the vehicle 10 may be made to travel in a manner so that the travel driving force Fd corresponds to the specified vehicle velocity V on the travel resistance line 300.

[A-2-2. MOT Travel Mode]

The MOT travel mode (rotary electric machine travel mode) is a mode in which the traction motor 24 drives the vehicle 10 primarily by the electrical power from the high voltage battery 34. As shown in FIG. 2, the MOT travel mode is used when traveling at a low velocity or a medium velocity, when traveling while coasting (with charging), and when traveling while coasting (without charging). Further, the MOT travel mode includes the control patterns PA11, PA12, and PA13.

In the control pattern PA11 (rotary electric machine cruising travel mode), the ENG clutch 26 and the GEN clutch 28 are disconnected (turned OFF), and the TRC clutch 30 is engaged (turned ON). The control pattern PA11 is utilized, for example, at times of low velocity traveling and medium velocity traveling (including low velocity cruising and medium velocity cruising).

In the control pattern PA12, the ENG clutch 26, the GEN clutch 28, and the TRC clutch 30 are turned ON. The control pattern PA12 is utilized, for example, at a time of low velocity acceleration. In this case, in addition to the motive power Ftrc of the traction motor 24 and the motive power Feng of the engine 20, motive power Fgen from the generator 22 is also used in driving the vehicle 10, whereby a particularly large vehicle driving force can be generated. Moreover, the control pattern PA12 may be perceived as pertaining to the ENG travel mode.

The term low velocity as mentioned herein refers to, for example, a range that is greater than 0 km/h and less than any value from 10 to 20 km/h. Further, the term medium velocity refers to, for example, a range that is greater than an upper limit value of the low velocity and less than any value from 60 to 120 km/h. Furthermore, the term high velocity as will be discussed later refers to, for example, a range that is greater than an upper limit value of the medium velocity and less than a high velocity upper limit value of the vehicle 10.

In the control pattern PA13, the ENG clutch 26, the GEN clutch 28, and the TRC clutch 30 are turned OFF. In accordance therewith, it becomes possible to improve the travel efficiency (or actual fuel consumption) of the vehicle 10, for example, by causing the vehicle 10 to travel while coasting, without being accompanied by generation of electrical power in the generator 22 or the traction motor 24.

[A-2-3. Hybrid Travel Mode]

In the hybrid travel mode, while the generator 22 is generating electrical power by the motive power Feng of the engine 20, the traction motor 24 drives the vehicle 10 using the generated electrical power. As shown in FIG. 2, the hybrid travel mode is used at a time of medium velocity acceleration and at a time of high velocity acceleration. The hybrid travel mode includes a control pattern PA21 (rotary electric machine cruising travel mode). In the control pattern PA21, while the ENG clutch 26 (COM clutch 26) is turned OFF, the GEN clutch 28 and the TRC clutch 30 are turned ON. In accordance therewith, although the engine 20 is connected to the generator 22, the engine 20 is disconnected from the vehicle wheel 32.

[A-2-4. ENG Travel Mode]

The ENG travel mode (internal combustion engine travel mode) is a mode in which the vehicle travels using the engine 20 as a principal driving source. The ENG travel mode is used, for example, at a time of high velocity acceleration, at a time of high velocity cruising, and at a time of battery charging. The ENG travel mode includes the control patterns PA31 to PA34.

In the control pattern PA31, while the ENG clutch 26 and the TRC clutch 30 are turned ON, the GEN clutch 28 is turned OFF. In accordance therewith, for example, acceleration at high velocity is made possible.

In the control pattern PA32, while the ENG clutch 26 is turned ON, the GEN clutch 28 and the TRC clutch 30 are turned OFF. In accordance therewith, for example, high velocity cruising is made possible. Such high velocity cruising may be related to only a portion of a velocity region, even within a range that is greater than an upper limit value of the medium velocity and less than a vehicle velocity upper limit value of the vehicle 10. Moreover, according to the present specification, a case in which the vehicle velocity V is constant, and a case in which the vehicle velocity V fluctuates within a predetermined range are included within the definition of cruising.

In the control pattern PA33, while the ENG clutch 26 and the GEN clutch 28 are turned ON, the TRC clutch 30 is turned OFF. In accordance therewith, it becomes possible to carry out charging of the high voltage battery 34 or the like.

In the control pattern PA34, while the ENG clutch 26 and the TRC clutch 30 are turned OFF, the GEN clutch 28 is turned ON. In accordance therewith, for example, when the vehicle 10 is traveling while coasting, the generator 22 generates electrical power by the motive power Feng of the engine 20, whereby it becomes possible to carry out charging of the high voltage battery 34 or the like.

[A-2-5. Power Regeneration Mode]

The power regeneration mode is a mode that is used when the vehicle 10 is decelerating. The power regeneration mode includes the control pattern PA41. In the control pattern PA41, while the ENG clutch 26 and the GEN clutch 28 are turned OFF, the TRC clutch 30 is turned ON. In accordance therewith, by performing regeneration of power by the traction motor 24, it becomes possible to carry out charging of the high voltage battery 34 or the like.

A-3. Controls in the Present Embodiment

[A-3-1. Overview]

As discussed above, in the present embodiment, the ECU 54 switches the driving method of the vehicle 10 in accordance with the vehicle velocity V and the travel driving force Fd of the vehicle 10 (travel information of the vehicle 10) (see FIG. 2).

[A-3-2. ENG Torque Compensation Control]

(A-3-2-1. Overall Process Flow of ENG Torque Compensation Control)

Next, a description will be given of the ENG torque compensation control. The ENG torque compensation control is a control to compensate with the generator 22 any insufficiency of the engine torque Teng at a time of engagement of the first clutch 26. In addition, in the ENG torque compensation control of the present embodiment, it is assumed as a premise that the second clutch 28 is in a connected state, and the generator 22 is connected to the first transmission path 70.

Figure 3:
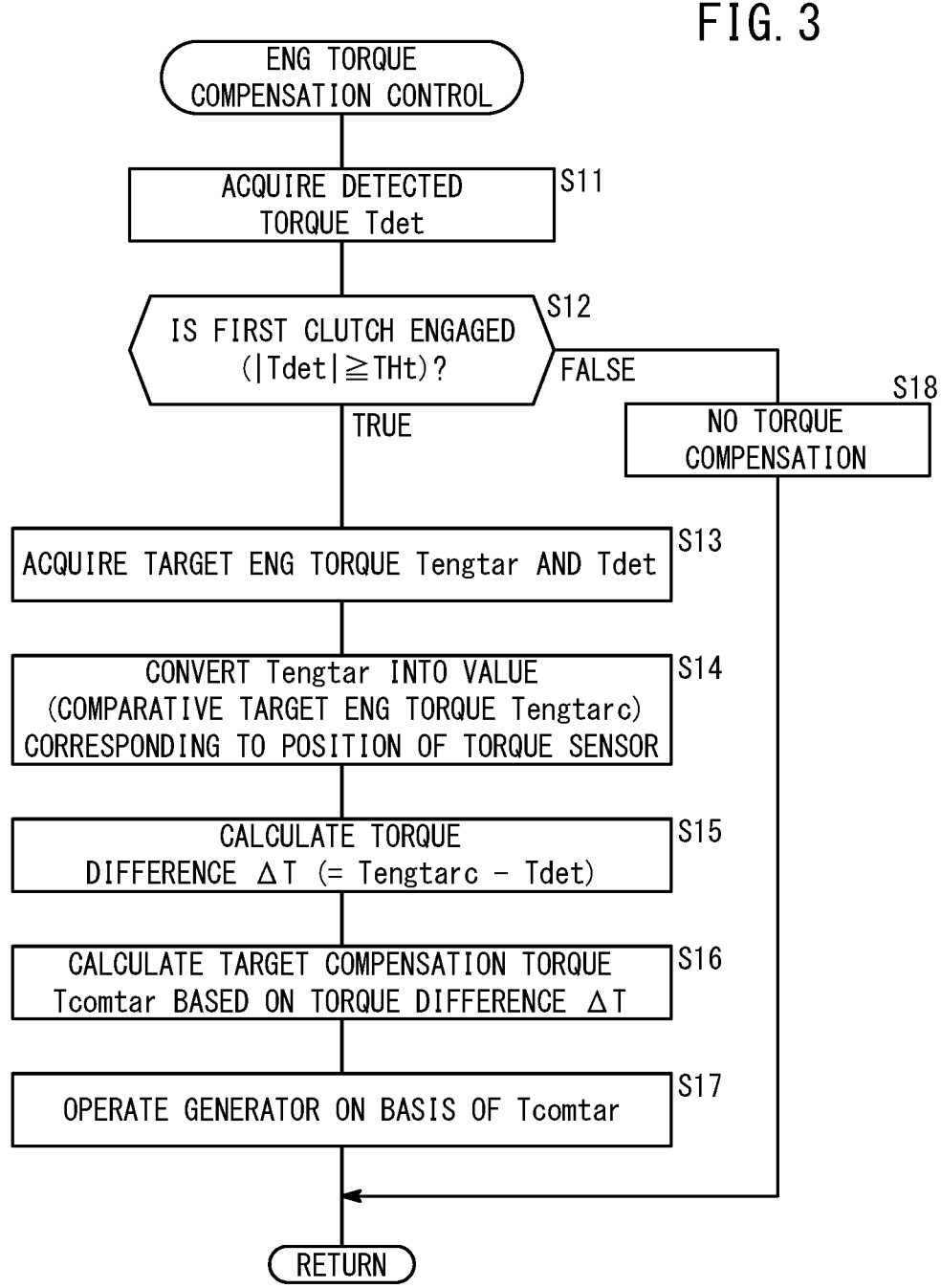
FIG. 3 is a flowchart of an ENG torque compensation control in the present embodiment.

FIG. 3 is a flowchart of the ENG torque compensation control in the present embodiment. In step S11, the ECU 54 acquires the detected torque Tdet from the torque sensor 46. In step S12, the ECU 54 determines whether or not the first clutch 26 is in an engaged state (or a connected state). For example, such a determination is made on the basis of whether or not an absolute value |Tdet| of the detected torque Tdet is greater than or equal to an engagement determination threshold value THt.

More specifically, as described above, the torque sensor 46 is provided on a common axis between the engine 20 and the generator 22. Stated otherwise, the torque sensor 46 is disposed between the engine 20 and the first clutch 26 (in particular, between the first branch point 74 and the first clutch 26). Therefore, in the case that the first clutch 26 is in a disengaged state, the detected torque Tdet is of a comparatively low value. On the other hand, in the case that the first clutch 26 is in an engaged state, the detected torque Tdet is of a comparatively high value. Accordingly, by using the absolute value |Tdet| of the detected torque Tdet, it is possible to determine whether or not the first clutch 26 is in an engaged state.

If the first clutch 26 is in an engaged state (step S12: TRUE), the process proceeds to step S13. In step S13, the ECU 54 acquires a target ENG torque Tengtar from the ENG control unit 102, and acquires the detected torque Tdet from the torque sensor 46. The target ENG torque Tengtar is a target value for the torque generated by the engine 20. Stated otherwise, the target ENG torque Tengtar is a target value for the torque with the engine 20 serving as a specified point within the first transmission path 70. Alternatively, a torque at another specified point (for example, a non-illustrated drive shaft) in the first transmission path 70 may be used as the target ENG torque Tengtar.

In step S14, the ECU 54 converts the target ENG torque Tengtar into a value corresponding to the position of the torque sensor 46 (hereinafter also referred to as a "comparative target ENG torque Tengtarc" or simply a "target torque Tengtarc"). More specifically, due to the relationship between the gear ratios of the respective shafts or the like, the torque Teng generated by the engine 20 becomes a different value at the position of the torque sensor 46. Thus, in order to perform a comparison with the detected torque Tdet, conversion thereof to the target torque Tengtarc is performed. It is also possible to compare the detected value of the torque sensor 46 with the target torque Tengtarc in reference to another specified point.

In step S15, the ECU 54 calculates a torque difference ΔT (=Tengtarc−Tdet) between the comparative target ENG torque Tengtarc and the detected torque Tdet. In step S16, on the basis of the torque difference ΔT, the ECU 54 calculates a target compensation torque Tcomtar of the generator 22. In the present embodiment, the target compensation torque Tcomtar is a target value of the compensation torque Tcom generated by the generator 22, and is set in a manner so that the torque difference ΔT approaches zero. By having the torque difference ΔT approach zero, it is possible to suppress pulsations of the engine 20 from being transmitted to the vehicle wheel 32 via the first transmission path 70.

When calculating the target compensation torque Tcomtar, the gear ratio between the position of the generator 22 and the position of the torque sensor 46 is taken into consideration. Further, in consideration of the inertia of the rotor of the generator 22, an inertia compensating torque may be reflected in the target compensation torque Tcomtar at a time that the rotor starts to move.

In step S17, the ECU 54 operates the generator 22 on the basis of the target compensation torque Tcomtar. Moreover, in steps S14 to S17, a feedback control such as a PID control may be performed on the basis of the detected torque Tdet.

Returning to step S12, in the case that the first clutch 26 is not in an engaged state (step S12: FALSE), then in step S18, the ECU 54 does not effect any torque compensation by the generator 22. Stated otherwise, the ECU 54 controls the generator 22 by setting the target compensation torque Tcomtar to zero.

(A-3-2-2. Applied Example of ENG Torque Compensation Control)

FIG. 4 is a time chart showing various numerical values in the case that the ENG torque compensation control is implemented in the present embodiment. In FIG. 4, the target ENG torque Tengtar, a target TRC torque Ttrctar, the detected torque Tdet, the target compensation torque Tcomtar, a target drive shaft torque Tdrtar, an engine shaft rotational speed N1, and a countershaft rotational speed N2 are shown. The target ENG torque Tengtar, the detected torque Tdet, and the target compensation torque Tcomtar are as described above. The target TRC torque Ttrctar is a target torque of the traction motor 24.

The target drive shaft torque Tdrtar is a target torque of a drive shaft (not shown) that supports the vehicle wheel 32. In FIG. 1, the drive shaft is disposed between the second branch point 78 and the vehicle wheel 32. The engine shaft rotational speed N1 is the aforementioned rotational speed [rpm] of the engine shaft. The countershaft rotational speed N2 is the rotational speed [rpm] of the countershaft. The countershaft is a shaft that is opposed to the drive shaft, and is arranged at the position of the second branch point 78.

In FIG. 4, in order to facilitate understanding, it should be noted that the gear ratio between the engine shaft and the countershaft is 1:1. Similarly, in FIG. 4, in order to facilitate understanding, it should be noted that the target ENG torque Tengtar, the target TRC torque Ttrctar, the detected torque Tdet, the target compensation torque Tcomtar, and the target drive shaft torque Tdrtar are established with reference to the drive shaft.

In FIG. 4, a condition is shown in which the MOT travel mode is switched to the ENG travel mode, in a state in which the vehicle 10 is traveling at a constant velocity (in other words, in a state in which the target drive shaft torque Tdrtar is constant). More specifically, in FIG. 4, the MOT travel mode takes place from time t11 to time t12. The period from time t12 to time t16 is a transitional stage from the MOT travel mode to the ENG travel mode. The ENG travel mode takes place after time t16.

When a transition to the ENG travel mode is initiated at time t12, the engine 20 is started, and the engine shaft rotational speed N1 increases. At time t12, since the first clutch 26 is not in a connected state, the detected torque Tdet of the torque sensor 46 remains at zero or a value close to zero.

At time t13, the first clutch 26 begins to transition from a disconnected state into a connected state. Therefore, at time t13, the detected torque Tdet abruptly decreases and the absolute value |Tdet| thereof becomes greater than or equal to the engagement determination threshold value THt (step S12 of FIG. 3: TRUE). Consequently, the ECU 54 determines that the first clutch 26 is engaged.

Accompanying the initial engagement of the first clutch 26, the ECU 54 causes the target compensation torque Tcomtar to be generated in the generator 22 (step S17 of FIG. 3, period from time t13 to time t14 in FIG. 4). Consequently, shocks that accompany the first clutch 26 being placed in the engaged state are alleviated. Generation of the target compensation torque Tcomtar is carried out while the first clutch 26 is engaged (see FIG. 3).

Further, accompanying the engagement of the first clutch 26, any change in the engine shaft rotational speed N1 and the counter shaft rotational speed N2 becomes the same. Moreover, even in the case that the gear ratio between the engine shaft and the counter shaft is not 1:1, after time t13, the amounts of change in the rotational speeds N1 and N2 are proportional to each other.

In the present embodiment, from the time that transitioning to the ENG travel mode is started, the ECU 54 sets the target ENG torque Tengtar to zero or a value close to zero, over a predetermined time period (a period from time t11 to time t15). This is in order to wait until the determination that the first clutch 26 has transitioned to the connected state to be confirmed. More specifically, when a predetermined time period has elapsed after the detected torque Tdet having become greater than or equal to an engagement initiation threshold value THt1 (FIG. 4), and after having become less than or equal to an engagement confirmation threshold value THt2 (<the engagement initiation threshold value THt1), the ECU 54 confirms the determination that the first clutch 26 has transitioned to the connected state. In addition, at time t15, the ECU 54 starts to increase the target ENG torque Tengtar, together with starting to decrease the target TRC torque Ttrctar.

At time t16, the target ENG torque Tengtar arrives at the target drive shaft torque Tdrtar, the target TRC torque Ttrctar becomes zero, and the transition to the ENG travel mode is completed.

A-4. Advantages and Effects of the Present Embodiment

According to the present embodiment, when the first clutch 26 (first switching device) is switched from the disconnected state to the connected state and drives the vehicle wheel 32 by the engine 20 (internal combustion engine) (step S12 of FIG. 3: TRUE), the compensation torque Tcom, which compensates for the torque difference ΔT between the comparative target ENG torque Tengtarc corresponding to the position (the specified point on the first transmission path 70) that corresponds to the torque sensor 46 and the detected torque Tdet (or the torque obtained by converting the detected torque Tdet into the torque at the specified point), is generated in the generator 22 (first rotary machine) (step S17 of FIG. 3). In accordance with this feature, it becomes possible to alleviate any shocks generated when the first clutch 26 is switched from the disconnected state to the connected state, thereby improving the riding comfort of the vehicle occupants.

In the present embodiment, the torque sensor 46 is a magnetostrictive torque sensor disposed between the first branch point 74 and the first clutch 26 (first switching device) on the first transmission path 70 (see FIG. 1). By using the magnetostrictive torque sensor, with a comparatively simple configuration, it becomes possible to detect the detected torque Tdet with high accuracy. Further, by arranging the torque sensor 46 between the first branch point 74 and the first clutch 26, it becomes possible to output the compensation torque Tcom with higher accuracy as compared to a case in which the torque sensor 46 is disposed between the engine 20 and the first branch point 74.

In the present embodiment, on the basis of the vehicle velocity V and the travel driving force Fd (travel information of the vehicle 10), the ECU 54 (control device) switches between the MOT travel mode (rotary electric machine travel mode) in which the vehicle wheel 32 is driven by the traction motor 24 (second rotary electric machine) in a state in which the first clutch 26 (first switching device) is in a disconnected state, and the ENG travel mode (internal combustion engine travel mode) in which the vehicle wheel 32 is driven by the engine 20 in a state in which the first clutch 26 is in a connected state (see FIGS. 2 and 4). Further, when switching from the MOT travel mode to the ENG travel mode, the ECU 54 causes the generator 22 (first rotary electric machine) to generate the compensation torque Tcom (see FIGS. 3 and 4). In accordance with this feature, it becomes possible to alleviate any shocks generated by the first clutch 26 when switching from the MOT travel mode to the ENG travel mode.

In the present embodiment, the ECU 54 (control device) determines whether or not the first clutch 26 (first switching device) is in a connected state on the basis of the detected torque Tdet (step S12 of FIG. 3). In accordance with this feature, it becomes possible to determine the connected state of the first clutch 26 with high accuracy.

B. Modifications

It is a matter of course that the present invention is not limited to the above-described embodiment, and various modified or additional configurations could be adopted therein based on the descriptive content of the present specification. For example, the following configurations can be adopted.

B-1. Objects to which the Present Invention is Applied

The vehicle 10 of the above-described embodiment includes the engine 20, the generator 22, and the traction motor 24 (see FIG. 1). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, as shown in FIG. 10 of Japanese Laid-Open Patent Publication No. 2017-100590, the vehicle 10 may be configured to include the engine 20 and a single rotary electric machine. Alternatively, a configuration is also possible that includes the engine 20 and three rotary electric machines.

B-2. Rotary Electric Machines

The first rotary electric machine 22 and the second rotary electric machine 24 of the above-described embodiment are three-phase AC brushless type rotary electric machines. However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. The first rotary electric machine 22 and the second rotary electric machine 24 may be of a direct current type or a brush type. Both of the first rotary electric machine 22 and the second rotary electric machine 24 of the above-described embodiment are interior permanent magnet type synchronous motors (IPMSM). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. The first rotary electric machine 22 and the second rotary electric machine 24 may be other types of rotary electric machines.

B-3. Clutches

According to the above-described embodiment, the first through third clutches 26, 28, 30 are provided (see FIG. 1). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, the second clutch 28 or the third clutch 30 can be omitted.

In the above-described embodiment, the traction motor 24 and the third clutch 30 are connected to the second branch point 78 between the ENG clutch 26 and the vehicle wheel 32 (FIG. 1). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, the second branch point 78 may be located more on the side of the engine 20 than the ENG clutch 26.

B-4. Torque Sensor 46

In the above-described embodiment, the torque sensor 46 is a magnetostrictive torque sensor. However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, the torque sensor 46 can utilize other types of detection methods.

In the above-described embodiment, among portions of the engine shaft, the torque sensor 46 is disposed on a common axis between the engine 20 and the generator 22. Stated otherwise, in the above-described embodiment, the torque sensor 46 is disposed between the first branch point 74 and the first clutch 26 (see FIG. 1). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, the torque sensor 46 may be disposed between the engine 20 and the first branch point 74 in the first transmission path 70.

B-5. ENG Torque Compensation Control

In the above-described embodiment, the generator 22 is the control target of the ENG torque compensation control (see FIGS. 3 and 4). However, for example, from the standpoint of generating the compensation torque Tcom from a rotary electric machine, the present invention is not necessarily limited to this feature. For example, it is also possible for the traction motor 24 to generate the compensation torque Tcom with the traction motor 24 serving as the control target for the ENG torque compensation control.

According to the above-described embodiment, when the first clutch 26 is engaged (step S12 of FIG. 3: TRUE), the compensation torque Tcom from the generator 22 continues to be generated (step S17). However, for example, insofar as the compensation torque Tcom is generated in the rotary electric machine on the basis of the torque difference ΔT between the comparative target ENG torque Tengtarc and the detected torque Tdet of the torque sensor 46, the present invention is not limited to this feature. For example, generation of the compensation torque Tcom can be performed only during a period in which the first clutch 26 is transitioning from the disconnected state to the connected state. Alternatively, in addition to taking place during transitioning from the disconnected state to the connected state, it is also possible to generate the compensation torque Tcom only at a time of rapid acceleration in which the AP operation amount θap is greater than or equal to an operation amount threshold value THθap.

According to the above-described embodiment, the determination as to whether or not the first clutch 26 is in a connected state (step S12 in FIG. 3) was made on the basis of the detected torque Tdet. However, for example, from the standpoint of determining whether or not the first clutch 26 is in a connected state, the present invention is not limited to this feature. For example, it is also possible to determine whether or not the first clutch 26 is in a connected state on the basis of an operational state of a non-illustrated actuator that controls the connected state of the first clutch 26.

In the above-described embodiment, a case in which the generator 22 is generating electrical power was not touched upon. However, for example, taking into consideration a case in which the generator 22 is generating electrical power, the ECU 54 (control device) may operate in the following manner.

More specifically, when the vehicle wheel 32 is driven by the engine 20 with the first clutch 26 being in a connected state, the ECU 54 determines whether or not generation of electrical power by the first rotary electric machine 22 is required. In the case it is determined that generation of electrical power by the first rotary electric machine 22 is required, the ECU 54 calculates a target GEN torque Tgentar by adding the target compensation torque Tcomtar to a target generated torque of the first rotary electric machine 22. In the case it is determined that generation of electrical power by the first rotary electric machine 22 is not required, the ECU 54 causes the generator 22 to directly output the target compensation torque Tcomtar without modification.

In accordance with these features, it becomes possible to operate the first rotary electric machine 22 on the basis of the torque difference ΔT, both in the case that generation of electrical power by the first rotary electric machine 22 is required, as well as in the case that generation of electrical power is not required.

In the above-described embodiment, the torque difference ΔT is defined by a difference between the comparative target ENG torque Tengtarc and the detected torque Tdet (step S15 of FIG. 3). However, for example, from the standpoint of compensating with the generator 22 or the traction motor 24 the result obtained by comparing the target torque of the engine 20 with the detected torque Tdet of the torque sensor 46 at the specified point of the first transmission path 70, the present invention is not limited to this feature. For example, it is also possible to calculate the torque difference ΔT using a non-illustrated drive shaft as the specified point.

B-6. Other Considerations

In the above-described embodiment, cases exist in which an equal sign is included or not included in the numerical comparisons (step S12 of FIG. 3, etc.). However, for example, insofar as there is no special reason for including or excluding such an equal sign (or stated otherwise, for cases in which the effects of the present invention are obtained), it can be set arbitrarily as to whether to include an equal sign in the numerical comparisons.

As to what this implies, for example, the determination as to whether or not the absolute value |Tdet| of the detected torque Tdet in step S12 of FIG. 3 is greater than or equal to the engagement determination threshold value THt (|Tdet|≥THt) can be changed to a determination as to whether or not the absolute value |det| is greater than the engagement determination threshold value THt (|Tdet|>THt).

What is claimed is:

1. A hybrid vehicle comprising:
an internal combustion engine;
a first transmission path configured to transmit power generated by the internal combustion engine to a vehicle wheel;
a first switching device disposed on the first transmission path, and configured to switch between a connected state and a disconnected state between the internal combustion engine and the vehicle wheel;
a first rotary electric machine;
a second transmission path connecting the first rotary electric machine and a first branch point, the first branch point located closer to the internal combustion engine than the first switching device within the first transmission path;
a second rotary electric machine;
a third transmission path connecting the second rotary electric machine and a second branch point, the second branch point located closer to the vehicle wheel than the first switching device within the first transmission path; and
a control device configured to control the internal combustion engine, the first switching device, the first rotary electric machine, and the second rotary electric machine;
the hybrid vehicle further comprising a torque sensor configured to detect a torque, and which is disposed between the internal combustion engine and the first switching device on the first transmission path;
wherein, when the first switching device is switched from a disconnected state to a connected state and drives the vehicle wheel by the internal combustion engine, the control device is configured to:

calculate a torque difference between a target torque of the internal combustion engine corresponding to a specified point on the first transmission path, and the detected torque detected by the torque sensor or a torque obtained by converting the detected torque into a torque at the specified point; and generate in the first rotary electric machine or the second rotary electric machine a compensation torque that compensates for the torque difference.

2. The hybrid vehicle according to claim 1, wherein the torque sensor is a magnetostrictive torque sensor disposed between the first branch point and the first switching device on the first transmission path.

3. The hybrid vehicle according to claim 1, wherein on a basis of travel information of the vehicle, the control device is configured to switch between:

a rotary electric machine travel mode in which the vehicle wheel is driven by the second rotary electric machine in a state in which the first switching device is in the disconnected state; and an internal combustion engine travel mode in which the vehicle wheel is driven by the internal combustion engine in a state in which the first switching device is in the connected state;

wherein, when switching from the rotary electric machine travel mode to the internal combustion engine travel mode, the control device is configured to cause the first rotary electric machine to generate the compensation torque.

4. The hybrid vehicle according to claim 1, wherein the control device is configured to determine whether or not the first switching device is in the connected state on a basis of the detected torque.

5. A control method for controlling a hybrid vehicle, wherein the hybrid vehicle comprises:

an internal combustion engine;

a first transmission path configured to transmit power generated by the internal combustion engine to a vehicle wheel;

a first switching device disposed on the first transmission path, and configured to switch between a connected state and a disconnected state between the internal combustion engine and the vehicle wheel;

a first rotary electric machine;

a second transmission path connecting the first rotary electric machine and a first branch point, the first branch point located closer to the internal combustion engine than the first switching device within the first transmission path;

a second rotary electric machine;

a third transmission path connecting the second rotary electric machine and a second branch point, the second branch point located closer to the vehicle wheel than the first switching device within the first transmission path; and a control device configured to control the internal combustion engine, the first switching device, the first rotary electric machine, and the second rotary electric machine;

the hybrid vehicle further comprising a torque sensor configured to detect a torque, and which is disposed between the internal combustion engine and the first switching device on the first transmission path;

wherein, when the first switching device is switched from a disconnected state to a connected state and drives the vehicle wheel by the internal combustion engine, the control device performs the method comprising the steps of:

calculating a torque difference between a target torque of the internal combustion engine corresponding to a specified point on the first transmission path, and the detected torque detected by the torque sensor or a torque obtained by converting the detected torque into a torque at the specified point; and generating in the first rotary electric machine or the second rotary electric machine a compensation torque that compensates for the torque difference.

* * * * *